W. S. HADAWAY, Jr.
ELECTRIC HEATER.
APPLICATION FILED AUG. 1, 1917.

1,408,502.

Patented Mar. 7, 1922.
2 SHEETS—SHEET 1.

Inventor
William S. Hadaway Jr.
By his Attorneys
Marshall & Dearborn

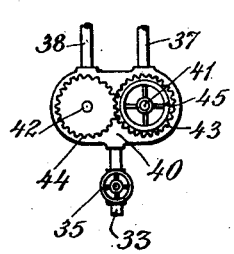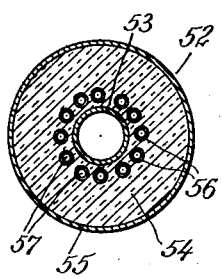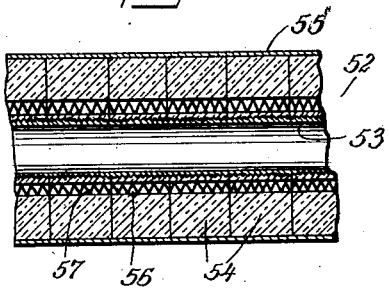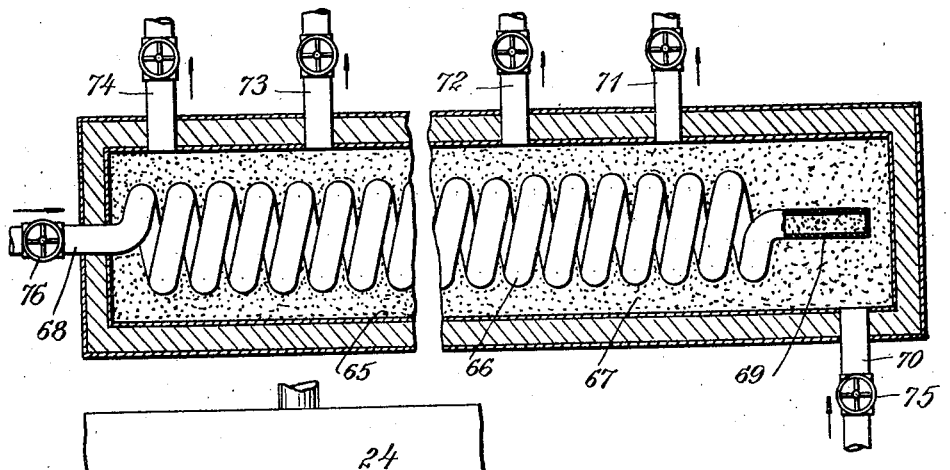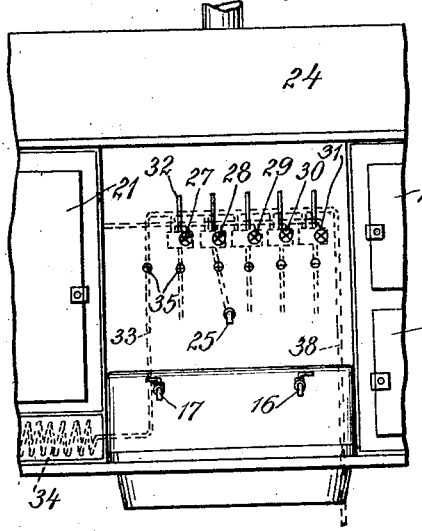

UNITED STATES PATENT OFFICE.

WILLIAM S. HADAWAY, JR., OF NEW ROCHELLE, NEW YORK.

ELECTRIC HEATER.

1,408,502.  Specification of Letters Patent.  Patented Mar. 7, 1922.

Application filed August 1, 1917. Serial No. 183,862.

*To all whom it may concern:*

Be it known that I, WILLIAM S. HADAWAY, Jr., a citizen of the United States of America, and a resident of New Rochelle, Westchester county, and State of New York, have invented certain new and useful Improvements in Electric Heaters, of which the following is a specification, reference being had to the accompanying drawings, forming a part thereof.

My invention relates to electric heating appliances and particularly to unit load factor apparatus to which electric energy is continuously supplied.

One object of my invention is to provide a heat storage apparatus adapted to receive heat slowly and give up its heat, either slowly or rapidly, according to the demands made upon it.

Another object of my invention is to combine an electric heater and steam generator that shall be relatively simple in construction and that shall be comparable in general to a hot water tank or boiler rather than a steam boiler.

Another object of my invention is to provide a simple and compact means adapted to receive electric energy, for producing an available supply of hot water, a quantity of low temperature or saturated steam, and a quantity of high temperature or superheated steam.

Another object of my invention is to provide a system of heat distribution adapted to produce steam at varying temperatures suitable for different cooking and heating operations.

In order that my invention may be thoroughly understood I will now proceed to describe the same in the following specification, and then point out the novel features thereof in appended claims.

Referring to the drawings:

Figure 3 shows in detail one of the control or mixing valves adapted for governing the temperature in the various steam branches.

Figure 4 is a transverse sectional view of a single heater unit forming a part of the storage heater and steam generator, of Figures 1 and 2.

Figure 5 is a longitudinal section showing a portion of the same structure, both Figures 4 and 5 being drawn to a relatively large scale.

Figure 6 is a longitudinal section of a steam distributor adapted to receive both high and low temperature steam and having a plurality of outlets from which steam may be discharged at intermediate temperatures.

Figure 7 is a partial elevation corresponding to Figure 1, showing a slightly modified arrangement which also constitutes an embodiment of my invention.

Figure 1:
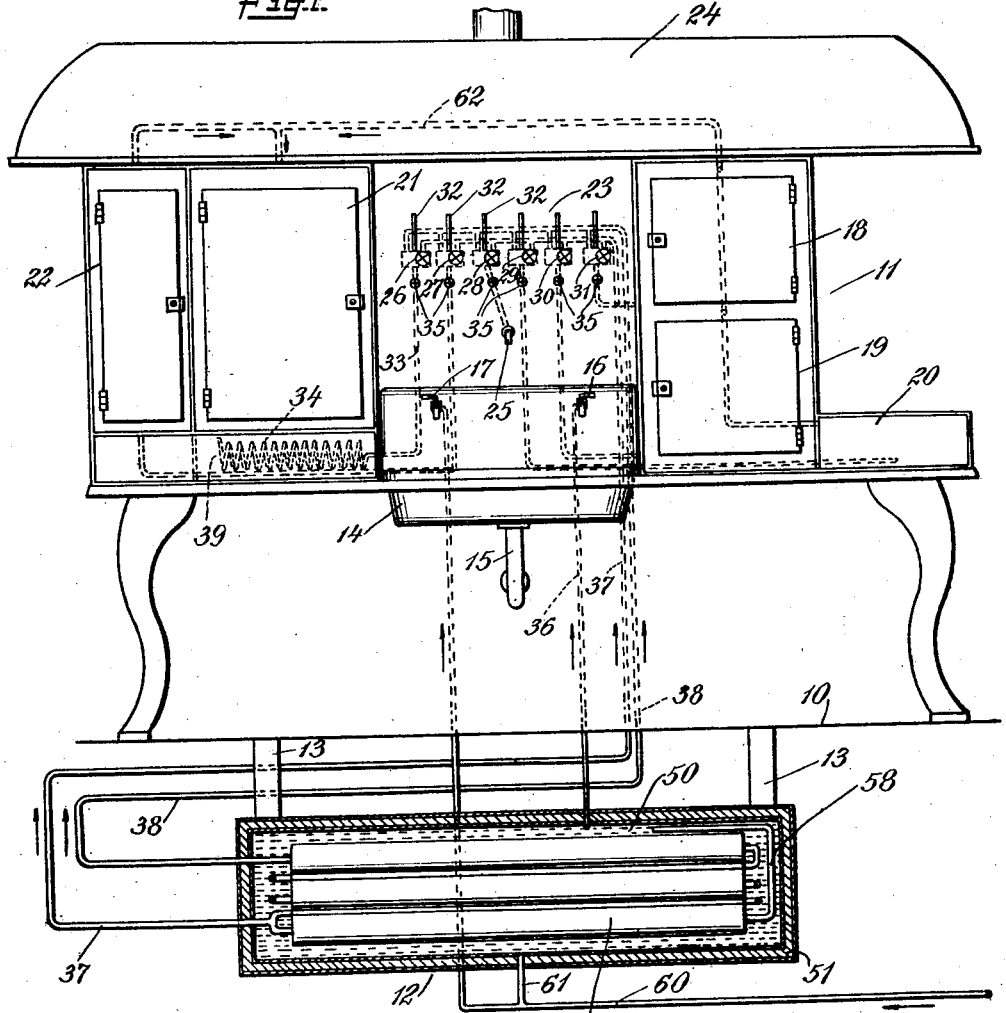
Figure 1 is a partial sectional elevation showing a storage heater and steam generator, a range, and a distributing system all constituting an embodiment of my invention and arranged in accordance therewith.

In Figure 1, 10 designates the floor line and 11 a cooking range or kitchen equipment while 12 designates a combination water heater and steam generator which may be disposed in any suitable locality, being shown as suspended from the basement ceiling by straps 13.

The range may be constructed in any suitable manner like that for example, shown and described in my copending application Serial No. 82,069 filed March 4th, 1916. It comprises a sink 14 having a waste pipe 15 and hot and cold water faucets 16 and 17; a high temperature oven 18, a low temperature oven 19, and a frying compartment 20, at the right of the sink; and a steam chamber 21 and a broiler 22 at the left of the sink. The range further is provided with a control panel 23 over the sink at the back, and the whole range is overhung by a hood 24.

On the control panel 23 is a steam outlet 25, a plurality of mixing valves 26 to 31 inclusive, with thermometers 32 associated with each mixing faucet for indicating the temperature of the steam being discharged therefrom. The valve 26 controls the temperature of the steam supplied through a distributing pipe 33 to a steamer coil 34, the mixing valves 27, 29, 30 and 31 being respectively arranged to control the temperature of the steam supplied to the broiler 22, the frying compartment 20, the low temperature oven 19, and the high temperature oven 18. The valve 28 governs the temperature of the steam discharged from the outlet 25. 35 designates shut-off valves in the several distributing pipes.

Hot water is supplied from the hot water heater and steam generator 12 through a pipe 36 to the hot water faucet 16. Low temperature steam at 212°, for example, is supplied from the steam generator through a pipe 37 to the mixing valves while high temperature steam, say, at 800° F. is supplied from the steam generator through a pipe 38 to the mixing valves.

The coil 34 is disposed in a water receptacle 39 in the bottom of the steam chamber and it constitutes a secondary steam generator which fills the interior of the steam chamber 21 with wet steam.

It is evident that the mixing faucet 26 may be dispensed with and only high temperature steam from the pipe 38 supplied to the coil 34.

On the other hand, the coil 34 may be dispensed with and steam may be supplied directly from the low temperature steam pipe 37 to the interior of the steam chamber 21.

Where the distances are relatively great or where for any cause it is particularly desirable to reduce the number of pipes connecting the steam generator to the range, the pipe connection 37 may be dispensed with and high temperature steam supplied from the steam generator through the pipe 38, low temperature steam being drawn from the interior of the steam chamber 21 which in this case would constitute a source of low temperature steam and be connected to each of the mixing valves as shown in Figure 7.

The mixing valves may be arranged in any suitable manner, but I prefer to employ the arrangement shown in Figure 3 in which 40 designates a mixing chamber to which the pipes 37 and 38 are connected and controlled by valves 41 and 42 to which are affixed a pair of gears 43 and 44. These gears are in mesh and only one of the valves is provided with a valve control handle 45. When this handle is turned in one direction, one of the valves is opened and the other closed so that it is only necessary to turn the valve handle 45 in one direction or the other to raise or lower the temperature of the mixture which is discharged through a distributing pipe 33 for example, the quantity being governed by the shut-off valve 35.

Figure 2:
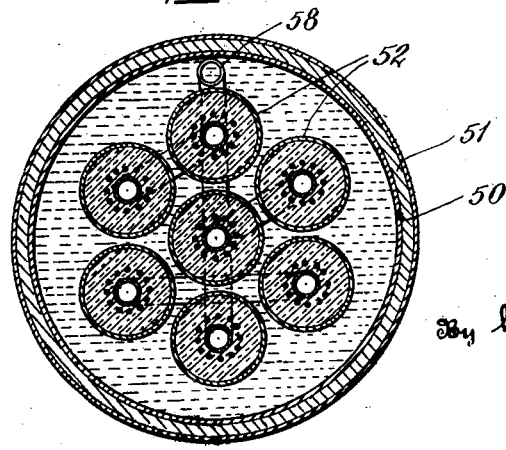
Figure 2 is a transverse sectional elevation through the storage heater forming a part of the apparatus shown in Figure 1.

Special reference may now be had to Figures 2 and 4 which illustrate the water heater and steam generator in detail. The structure comprises a hot water tank or boiler 50 which is preferably surrounded by a lagging or a covering 51 of heat insulation. Within the tank are disposed a plurality of heat storage units 52. The units are identical and each of them comprises, as shown on a larger scale in Figure 4, an inner tube or pipe 53 on which is mounted a cylindrical body 54 of soapstone, or other suitable insulating mass having a large heat capacity. I prefer to externally thread the pipe 53 and make the soapstone mass in the form of a plurality of relatively short, cylindrical sections which are threaded onto the pipe.

The soapstone mass 54 is preferably provided with an outer casing 55 of sheet metal or the like.

The soapstone mass 54 is further provided with a plurality of longitudinal holes or slots 56 near the central pipe 53 and electric heaters 57 are disposed therein. These heaters may conveniently be in the form of open helices of resistance wire.

The pipes 53 of the several units 52 are interconnected in series or in some other suitable relation, the connection being established as shown in Figures 1 and 2 from a hot water receiving pipe 58, which opens into the water tank 50 near the top, to the bottom unit 52 (see Figure 2), thence to the lower left hand unit, lower right hand unit, upper right hand unit, central unit, upper left hand unit, to the top unit, the connection between the bottom unit and the lower left hand unit being joined to the pipe 37 and the outlet end of the top unit being connected to the high temperature steam pipe 38.

The electric heaters of the various storage units may be connected in multiple, series multiple, or any suitable circuit relation, and may be provided with a control switch (not shown) for rearranging the circuit connections to produce different degrees of heat.

Assuming that a relatively small amount of electric energy is continuously supplied to the electric heaters of the several units, and that the amount of energy supplied is cumulatively sufficient for the total demands on the system,—under these conditions the heat continuously generated in the heaters is given up to the storage mass represented by the soapstone cylinders 54 and the body of water with which the tank or boiler 50 is filled, the tank being connected to a water main 60 by a branch 61.

Whenever steam is drawn from any of the steam outlets by reason of the utilization of heat in the several compartments of the range, water flows from the tank or boiler 50 through the pipe 58 into the interior pipe 53 of the bottom unit.

Inasmuch as each unit has its electric heaters located near the interior pipe 53 the space within the pipe is maintained at a relatively high temperature sufficient to constitute the bottom unit a flash boiler, the hot water being immediately turned into steam therein.

The steam from the lower unit flows through the low temperature steam pipe 37 to supply the demands therefrom and flows through the pipes 53 of the remaining units in which its temperature is gradually increased until it is finally discharged to the pipe 38 in the condition of dry, superheated steam.

It is evident that the system responds to the demands upon it, just the necessary water being supplied from the water main to make up for any steam drawn from the system or for any hot water drawn through the faucet 16 and the steam being automatically generated as fast as necessary to make up for condensation losses, standby losses, and useful heat expended in the apparatus.

The steam after giving up part of its heat in the relatively high temperature section of the range, such as the ovens 18, 19, the frying compartment 20, and the broiler 22, flows through the outlet pipes 62 to the steam chamber 21. As fast as the steam is condensed in the steam chamber 21, it flows down the walls thereof into the water receptacle 39, where it is again turned into steam.

Instead of providing mixing valves for individually controlling the temperature for each compartment of the range, I may utilize a device such as that shown in Figure 6, to which reference may now be had. This device is structurally similar to the heat exchange unit shown and described in my copending application Serial No. 170,359 filed May 23rd, 1917, and comprises a metal tube or pipe 65 within which is an inner tube or pipe 66 which may have the form of a helix. The pipes are separated by a filling of quartz particles or carborundum particles or the like designated 67, the interior of the coil or pipe 66 being also preferably filled with like material.

High temperature steam such as that available from the pipe 38 for example, is supplied to one end 68 of the pipe 66, the opposite end of the pipe terminating in the perforated nozzle 69 within pipe 65. The pipe 66 is substantially coextensive with the outer pipe 65 and the perforated nozzle 69 is near the opposite end of the pipe 65 from the inlet end to which high temperature steam is supplied.

A low temperature steam supply pipe 70 is connected to the outer pipe 65 near the nozzle end of the pipe 66. The pipe 65 is furthermore provided with a plurality of intermediate taps or outlets 71, 72, 73 and 74. These are representative of any desired number and the temperature of the steam drawn from each depends upon its position. Consequently, by properly locating the taps and by providing control valves 75 and 76 in the inlet pipes 70 and 68, steam may be delivered from the taps at predetermined temperatures desired for use in the various compartments of the range.

The variations in temperature are dependent upon the heat exchange between the inner pipe 66 and the outer pipe 65, the temperature at one end of the system being substantially 212° due to the fact that steam is supplied at that point from the pipe 70. On the other hand the opposite end of the device is maintained at substantially 800° or whatever the temperature may be of the incoming high temperature steam. The temperature falls off gradually within the inner pipe from one end to the other, whereas it builds up gradually in the outer pipe from the intake end to the outlet end.

My invention may be embodied in structures which differ widely from each other and from those shown and described, and I intend that only such limitations be imposed as are indicated in the appended claims.

What I claim is:

1. A source of high temperature steam, a water receptacle, a steam chamber communicating therewith, a heating coil in the water receptacle connected to the source of high temperature steam, and means for mixing the low temperature steam in the steam chamber with steam from the high temperature source to produce intermediate temperatures as desired.

2. A source of superheated steam, a water receptacle, a steam coil in the water receptacle connected to the source of superheated steam, a steam chamber adapted to receive low temperature steam from the water receptacle, a mixing valve, intake connections thereto from the steam chamber and from the source of high temperature steam, a steam outlet also connected from the mixing chamber to the steam coil, and means for controlling the proportion of steam supplied from each source to said coil from each.

3. A source of superheated steam, a water receptacle, a steam coil in the water receptacle connected to the source of superheated steam, a steam chamber adapted to receive low temperature steam from the water receptacle, a mixing valve, and intake connections thereto from the steam chamber and from the source of high temperature steam, a steam outlet also connected to said coil, said mixing valve adapted to simultaneously open one of the connections and close the other to determine the proportion of steam supplied from each source and the temperature of the steam discharged.

4. A range comprising a plurality of compartments, a steam distributing pipe connected to each compartment, a mixing valve connected to each distributing pipe and sources of steam at unlike temperatures connected to the mixing valves.

5. A range comprising a plurality of compartments, a steam distributing pipe connected to each compartment, a mixing valve connected to each distributing pipe, a steam connection from one of said compartments to said valves and another source of steam at unlike temperature connected to the mixing valve, and valves being arranged to control and proportion the steam supplied to the compartments.

In witness whereof, I have hereunto set my hand this 20 day of July, 1917.

WILLIAM S. HADAWAY, Jr.